United States Patent [19]

Parsons

[11] 4,297,693

[45] Oct. 27, 1981

[54] APPARATUS FOR DISPLAYING GRAPHICS SYMBOLS

[75] Inventor: Robert Parsons, St. Neots, England

[73] Assignee: Texas Instruments Incorporated, Dallas, Tex.

[21] Appl. No.: 8,722

[22] Filed: Feb. 2, 1979

Related U.S. Application Data

[63] Continuation of Ser. No. 806,415, Jun. 14, 1977, abandoned.

[30] Foreign Application Priority Data

Jun. 21, 1976 [GB] United Kingdom ............... 25726/76

[51] Int. Cl.[3] .............................................. G06F 3/14

[52] U.S. Cl. .................................... 340/744; 340/721; 340/799; 340/801; 340/790

[58] Field of Search ............... 340/747, 751, 790, 744, 340/732, 750, 799, 721, 801

[56] References Cited

U.S. PATENT DOCUMENTS

| | | | |
|---|---|---|---|
| 3,609,443 | 9/1971 | Manber | 340/751 |
| 3,675,232 | 7/1972 | Strout | 340/790 |
| 3,686,662 | 8/1972 | Blixt et al. | 340/747 |
| 3,729,730 | 4/1973 | Sevilla et al. | 340/790 |
| 3,781,850 | 12/1973 | Gicca et al. | 340/747 |
| 3,792,463 | 2/1974 | Eriksson et al. | 340/751 |
| 3,821,730 | 7/1974 | Carey et al. | 340/747 |
| 4,163,229 | 7/1979 | Bodin et al. | 340/751 |

*Primary Examiner*—Marshall M. Curtis

*Attorney, Agent, or Firm*—Melvin Sharp; Gary C. Honeycutt; Douglas A. Lashmit

[57] ABSTRACT

Apparatus suitable for use with teletext display apparatus which is arranged to operate in a plurality of display modes, including a graphic display mode, in response to digital coded control signals, and to display in each mode digital coded data signals which provide the display information for the viewer. The digital coded control signals are interspersed among the digital coded data signals, with the result that no display information is normally available when a digital coded control signal is present, but the apparatus is so arranged that, in the graphics display mode, the digital coded, data signal which arrived immediately before the digital coded control signal is held over, and used to fill in the blank space that would correspond to the presence of the digital coded control signal. 'Hold over' is effected by arranging that a current data signal is held in a data store, and that the stored data is pushed out only by a subsequent data signal.

10 Claims, 12 Drawing Figures

CEEFAX CODE TABLE

| b7 | b6 | b5 | | Bits | 0 0 0 | 0 0 1 | 0 1 0 | | 0 1 1 | | 1 0 0 | | 1 0 1 | | 1 1 0 | | 1 1 1 | |
|---|---|---|---|---|---|---|---|---|---|---|---|---|---|---|---|---|---|---|
| b4 | b3 | b2 | b1 | Row / Column | 0 | 1 | 2 | | 3 | | 4 | | 5 | | 6 | | 7 | |
| 0 | 0 | 0 | 0 | 0 | NUL (2) | DLE (2) | | | 0 | | @ | @ | P | P | — | | p | |
| 0 | 0 | 0 | 1 | 1 | Alpha n Red | Graphics Red | ! | | 1 | | A | A | Q | Q | a | | q | |
| 0 | 0 | 1 | 0 | 2 | Alpha n Green | Graphics Green | " | | 2 | | B | B | R | R | b | | r | |
| 0 | 0 | 1 | 1 | 3 | Alpha n Yellow | Graphics Yellow | £ | | 3 | | C | C | S | S | c | | s | |
| 0 | 1 | 0 | 0 | 4 | Alpha n Blue | Graphics Blue | $ | | 4 | | D | D | T | T | d | | r | |
| 0 | 1 | 0 | 1 | 5 | Alpha n Magenta | Graphics Magenta | % | | 5 | | E | E | U | U | e | | u | |
| 0 | 1 | 1 | 0 | 6 | Alpha n Cyan | Graphics Cyan | & | | 6 | | F | F | V | V | f | | v | |
| 0 | 1 | 1 | 1 | 7 | Alpha n White (1) | Graphics White | ' | | 7 | | G | G | W | W | g | | w | |
| 1 | 0 | 0 | 0 | 8 | Flash | Concealed Display | ( | | 8 | | H | H | X | X | h | | x | |
| 1 | 0 | 0 | 1 | 9 | Steady (1) | Contiguous (1) Graphics | ) | | 9 | | I | I | Y | Y | i | | y | |
| 1 | 0 | 1 | 0 | 10 | End Box (1) | Separated Graphics | * | | : | | J | J | Z | Z | j | | z | |

FIG. 8a

CEEFAX CODE TABLE (CONT.)

NOTES.

① THESE CONTROL CHARACTERS ARE PRESUMED BEFORE EACH CHARACTER ROW.

② THE CODES DESIGNATED NUL, DLE, SO, SI AND ESC ARE RESERVED TO ASSIST COMPATIBILITY WITH INTERNATIONAL AND NATIONAL STANDARD DATA CODES.

CONTIGUOUS GRAPHICS CHARACTER 01101110

NON-CONTIGUOUS GRAPHICS CHARACTER 01101110

CONTIGUOUS GRAPHICS CHARACTER 11111110

APPARATUS FOR DISPLAYING GRAPHICS SYMBOLS

This is a continuation of application Ser. No. 806,415, filed June 14, 1977, now abandoned.

RELATED APPLICATION

Application Ser. No. 005,416 filed Jan. 22, 1979 is a continuation of application Ser. No. 806,411 filed June 14, 1977 by Robert Parsons for ALPHANUMERIC CHARACTER DISPLAY APPARATUS AND SYSTEM, said application also assigned to the Assignee of the present invention.

This invention relates to apparatus for providing a graphics display of the type in which graphical shapes are used to build up an area having a desired outline, such as a map.

It has been proposed to present, on a broadcast television receiver, several pages of information by transmitting the data in coded form during the unused lines of a television signal, storing the information at the receiver, and displaying the stored information on command at the receiver. Such a system is disclosed by U.S. Pat. No. 3,927,350 issued on Dec. 16, 1975 to Peter Rainger. A decoder which is suitable for use in conjunction with such a system has been disclosed by Bryan Horris and Robert Passons in an article entitled "Teletext Data Decoding—the LSI Approach", and published in the IEEE Transactions on Consumer Electronics Vol. CE-22 No. 3 August 1976 pages 247-253. One form of information that is of general interest, and is particularly suited to graphical presentation is a weather forecast. In order to present such information, the display must be capable of presenting a map of the country which may be divided into zones according to the variations in weather over the country, and such zones may be conveniently represented by different colours so as to enable them to be readily distinguished one from another. There are, of course, other forms of information which would be displayed as a map, graph, or chart on which colour changes would be effected in order to identify different zones.

In the United Kingdom, the standards for the transmission and reception of digitally coded data have been published jointly by the British Broadcasting Corporation, the Independent Broadcasting Authority, and the British Radio Equipment Manufacturers' Association in a document entitled "Specification of standards for information transmission by digitally coded signals in the field-blanking interval of 625-line television systems" dated September 1976. The proposed system employs ISO-7(BS4730:1974) code, which is generally equivalent to ASCII code with selected 'National Usage' characters. Bit number 1($b_1$) is transmitted first.

In the proposed system, each alphanumerics character and the space separating it horizontally and vertically from adjacent characters can be regarded as being located in a 'display rectangle'. The 'Display rectangle' is also used in the graphics mode, but without any separating space. In the graphics mode, each 'display rectangle' is divided into two parts in the horizontal direction and three parts in the vertical direction, to form six cells. A graphics shape is built up by having selected cells illuminated, a specific bit of the transmitted character code being allocated to each cell to define its state wither as 'off' or 'on'. There are seven bits used in each digital word which can be either a control character or data. A control character may be used to denote the colour in which information is to be displayed, and whether the data is alphanumerics or graphics, and display is continued in this colour and mode until another control character is transmitted to effect a change in colour and/or mode. The system displays a control character as a blank space, and this creates a problem when a graphics colour change is ordered, since the basic system then displays a blank space between adjacent colours. Blank spaces are undesirable since they introduce an extraneous feature into the display and because they can make it more difficult to interpret. It has been proposed to overcome this difficulty by generating a graphics character to fill in the blank space, but this results in the expense of a considerable amount of extra apparatus.

It is an object of the present invention to overcome, at least partially, the above difficulty in a simple and relatively inexpensive manner.

The present invention provides apparatus for controlling the display of information which is built up line by line on a raster-type display in response to digital coded data and control signals, the control signals indicating the mode in which subsequent data signals are to be displayed, there being a plurality of modes, including a graphics mode, of displaying each data signal, the apparatus including graphics symbol store means for providing in the graphics mode, in parallel, signals representative of the specified graphics symbol until a further data symbol is received, parallel to serial converter means for receiving the parallel signals from the graphics symbol store means and in response thereto producing in serial form, signals characteristic of the graphics symbol to be displayed, and control ogic means for changing the contentsof the graphics symbol store means only in response to a graphics symbol signal to cause said store means to produce the parallel signals stored in the graphics symbol store means for the duration of a control signal when the said control signal occurs in place of a data signal during the display of graphics symbols.

In raster-type display apparatus which is arranged to display digital coded data signals in a plurality of display modes which correspond to a plurality of digital coded control signals each of which, in operation, appears in place of a digital coded data signal, the display modes including a graphics symbol mode, the improvement comprises a graphics symbol store which is arranged to provide in the graphics mode, in parallel, signals representative of the graphics symbol specified by the current digital coded data signal until a further data signal is received, a parellel to serial converter which is arranged to receive the parallel signals from the graphics symbol store and to provide, in serial form, signals appropriate to the graphics symbol to be displayed, and control logic means which is arranged to change the contents of the graphics symbol store only in response to a graphics symbol signal, whereby the contents of the graphics symbol store are displayed as a graphics symbol for the duration of any digital coded control signal which appears in place of a digital coded data signal during the display of graphics symbols.

There may be first, second, or third control signals, the first control signals indicating a first mode of operation in which data signals are displayed as alphanumeric characters, the second control signals indicating a second mode of operation in which data signals are displayed as graphics symbols, and the third control signals indicating a third mode of operation in which the data signals are displayed as flashing alphanumerics, boxed alphanumerics, or the like.

The digital coded signals may be stored in an addressable data store as seven-digit words, each word representing a first, second, or third control signal or a data signal which may be displayed in any one of the three display modes.

The graphics symbol store may be a read-only-memory (ROM) in which each graphics symbol is stored as a binary word and is read out in parallel under an address command. Alternatively, the graphics symbol store may include an encoder consisting of an arrangement of logic gates which operate on a four-bit address and the input data signal to generate display control data, and data stores which store the generated display control data. The seven-digit word indicative of the graphics symbol to be displayed is applied to the graphics symbol store by the addressable data store, and the graphics symbol store provides, in parallel form, a signal from which the parallel to serial converter passes on a seven-bit signal to the video circuits of the display device, which may be a cathode ray tube. In the absence of a signal representing a graphics symbol, such as when a second or third control signal is read from the addressable data store, the parallel data output from the graphics symbol store is held over for the duration of the control signal, and the control signal is prevented from altering the data stored in the graphics symbol store. The display then repeats the last graphics symbol in the presence of the control signal.

The data stores of the graphics symbol store may have a capacity of two bits which correspond to the left-hand and right-hand cells of the 'display rectangle'.

The parallel to serial converter control logic may be arranged to accept non-graphics data signals in order to effect further variations of graphics symbols without altering the data held in the graphics symbol store. Such an arrangement with additional logic elements could provide non-contiguous graphics, for example.

Apparatus for displaying graphics symbols in accordance with the present invention will now be described by way of example only and with reference to the accompanying drawings, in which.

Figure 8B:
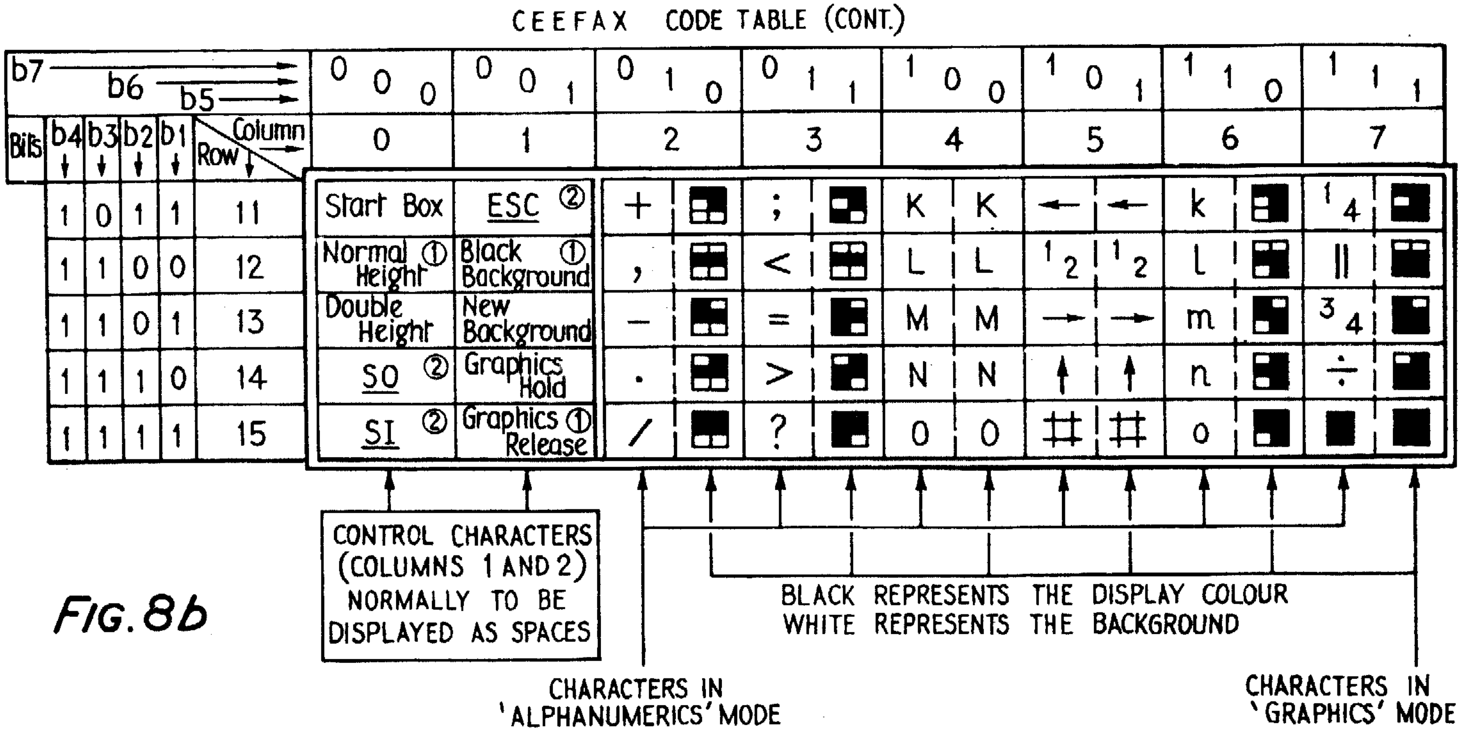

FIGS. 8*a* and 8*b* show a plan of the character codes for data broadcasting in the proposed system.

Figure 9:
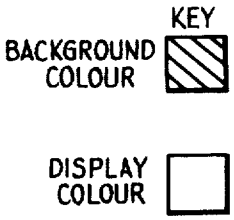
Figure 9:
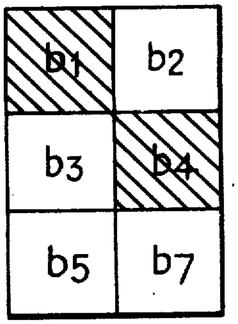

FIG. 9 is a plan of the arrangement of the cells in the 'display rectangle' for the contiguous graphics character 01101110.

Figure 10:
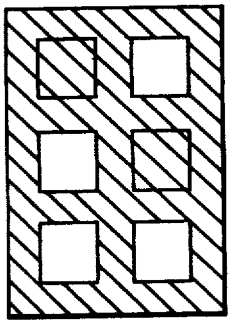

FIG. 10 is a plan of the arrangement of the cells in the 'display rectangle' for the non-contiguous graphics character 01101110.

Figure 11:
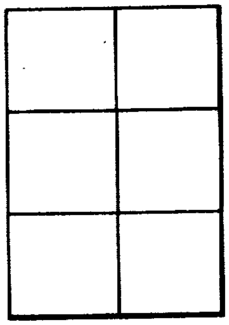

FIG. 11 is a plan of the arrangement of the cells in the 'display rectangle' for the contiguous character 11111110.

FIG. 8 and FIG. 9 will be referred to initially in order to provide technical background to the invention. FIG. 8 and FIG. 9 are extracts from the above mentioned 'Specification of standards for information transmission by digitally coded signals in the field blanking interval of 625-line television systems', and do not form any part of the present invention. Referring to FIG. 8, it can be seen that in columns 2, 3, 6 and 7, alphanumeric characters and graphics symbols are arranged in pairs, the same binary word being used to represent both the alphanumeric character and the graphics symbol of any pair. Ambiguity is avoided by the use of control characters which are listed in columns 0 and 1, the control characters being distinguished from data alphanumeric or graphics data by means of the last three bits. These are either 000 or 100. The display apparatus operates either in the graphics mode or the alphanumeric mode according to the most recent control character. If the display apparatus is operating in the graphics mode in one colour, and a colour change is to be effected, a control character corresponding to the new colour in the graphics mode is required to effect the change.

FIG. 9 illustrates the build up of a 'display rectangle' in the graphics mode. Six of the transmitted data bits are used to control the switching on of a sub-cell of the 'display rectangle', the bit $b_1$ corresponding to top left of the rectangle, bit $b_2$ corresponding to the top right of the rectangle, and continuing on as shown in FIG. 9. FIG. 9 shows the cells $b_2$, $b_3$, $b_5$, and $b_7$ illuminated, corresponding to the data word 01101110.

FIG. 10 shows the cells $b_2$, $b_3$, $b_5$ and $b_7$ illuminated, corresponding to the data word 01101110, but with a dark border which has been signalled by a 'non-contiguous graphics' control word.

FIG. 11 shows all the cells illuminated, corresponding to the data word 11111110, and an earlier 'contiguous graphics' control word.

Figure 2:
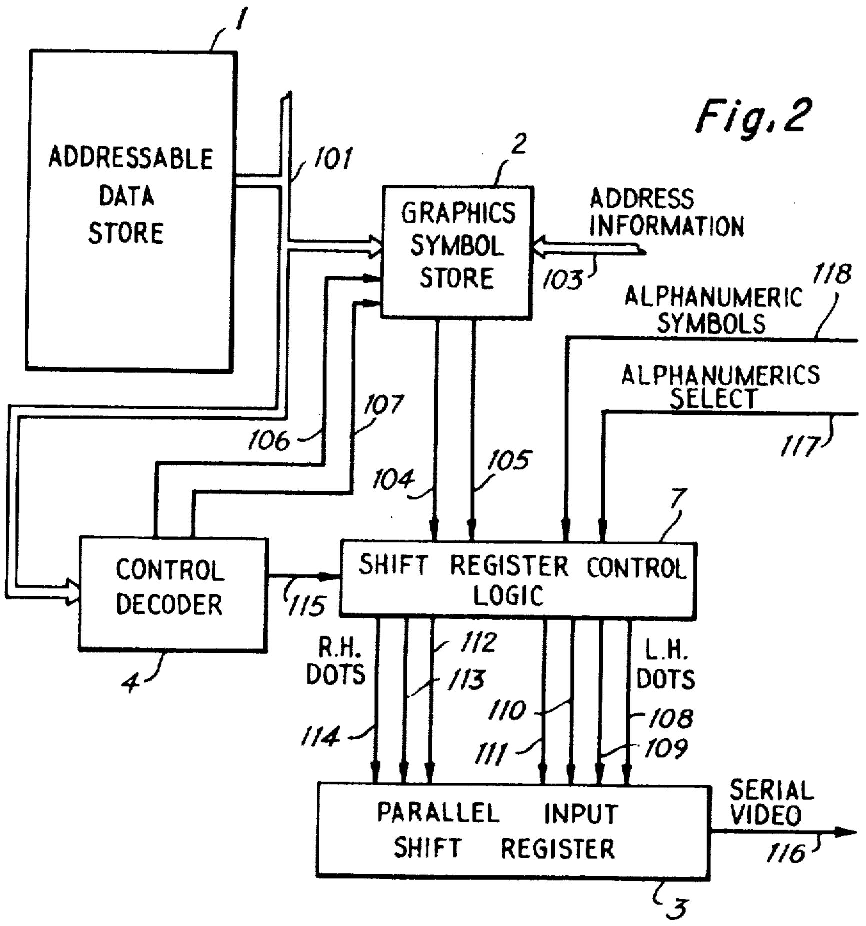
FIG. 2 is a block diagram representation of the arrangement for repeating a graphics symbol.

Referring now to FIG. 2, an addressable data store 1 is used to store binary coded data respresenting control words and data words that are to be displayed. The stored data need not all be representative of graphics symbols, but for the purposes of this description will be treated as representative of graphics symbols and the circuitry necessary to produce an alphanumeric display is not shown. Most of the coded data will represent graphics symbols, but some of the coded data will be control characters, the second control signals referred to above, indicating that the stored data is to be displayed as graphics symbols and the colour of the display. Since a second control signal (control character) occupies the same space (7 bits) as a graphics data signal, the presence of the second control signal represents a gap in the sequence of stored graphics data signals.

In the proposed teletext system, the coded information is stored as magazine pages, each page consisting of 24 rows of 40 characters. Therefore a page of information will contain 960 characters, and since each character is represented by 7 bits, a suitable addressable data store 1 would have a capacity of 6720 bits. A suitable addressable data store may be provided by a static n-channel RAM organised as IK by 7 bits.

Connected to the addressable data store 1 is a graphics symbol store 2 which acts as a graphics symbol generator and as a store for the generated graphics symbol. The graphics symbol store 2 is provided with 7-bit data inputs from the addressable data store 1 and 4-bit address inputs from the address control circuitry of the system indicating which horizontal line of the graphics character is to be generated. The address control circuitry is not shown. Each graphics symbol occupies ten lines of a television field, which results in the row address to the graphics symbol store 2 being cycled once for every ten television lines. The graphics symbol store 2 may be a read-only-memory (ROM) or it may include a combinational logic encoder.

The addressable data store 1 passes 7-bit data along the data path 101 to the graphics symbol store 2, and a control decoder 4. The graphics symbol store 2 receives, in addition four-bit address signal on the data path 103, and uses the address signals in combination with the 7-bit data signals arriving on the data path 101 to generate a two-bit output signal which leaves the graphics symbol store 2 on the output lines 104 and 105. The graphics symbol generator 2 also receives instructions from the control decoder 4 on the input lines 10 6 and 107. The two-bit output signal from the graphics symbol store 2 is passed to a shift register control logic circuit 7 which generates from this two-bit signal a seven-bit output signal which is passed to a parellel-input serial-output shift register 3 on the data lines 109 and 114. The shift register control logic circuit 7 also receives alphanumerics information from the input data line 118. The control logic 7 may receive alphanumeric or graphics symbols under the control of the line 117. The shift register 3 provides seven-bit serial output data on the output line 116. The control decoder 4 also exerts control over the shift register control logic circuit 7 by means of a data line 115 between them.

Figure 3:
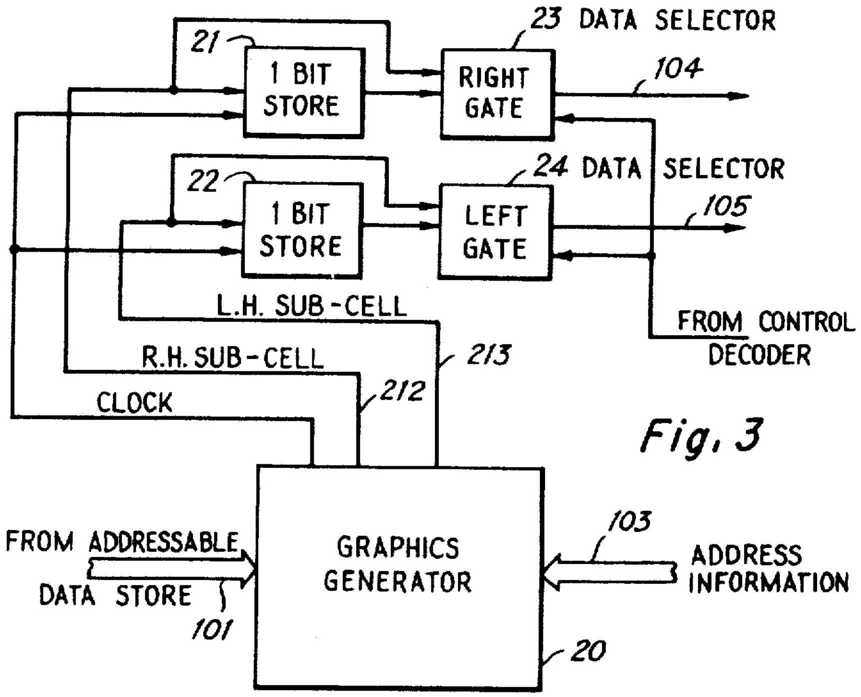
FIG. 3 is a block diagram representation of the graphics symbol store which is included in FIG. 1.

FIG. 3 illustrates in block form a graphics symbol store which consists of a graphics symbol generator 20, two 1-bit stores 21 and 22, a right gate 23 and a left gate 24. The graphics symbol store shown in FIG. 3 is arranged to operate with graphics symbols which are formed by a matrix of dots. The graphics symbols are seven dots wide and there are ten lines of dots in a rectangular pattern which is the same as the 'display rectangle' referred to earlier on. The 'display rectangle' is divided into a left-hand column of four dots' width and a right-hand column of three dots' width, and the columns are further divided into three rows, the top row being three lines deep, the middle row being four lines deep, and the bottom row being three lines deep. The graphics symbol store is used to store either a digital '1' or a digital '0' for both the left and the right hand columns while graphics information is being fed into it, and to freeze the stored data in the presence of data that is not a graphics character, thereby storing the most recent graphics character. In FIG. 3, the graphics data fed into the graphics generator 20 is processed by means of the address information which is also fed into the graphics generator 20, and digital signals on two lines pass to the 1-bit stores 21 and 22, and to the left and right gates 23 and 24.

The data coming from the graphics generator 20 passes through the left and right gates 23 and 24 and at the same time is stored in the 1-bit stores 21 and 22 for one clock period and is lost on the arrival of the next data signal from the graphics generator 20, as long as the next data signal includes the graphics clocking digit. In the absence of the graphics clocking digits the bits held in the 1-bit stores 21 and 22 are not overriden, and the left and right hand gates are instructed to pass the information held by the 1-bit stores 21 and 22 if a control character is present and the 'graphics hold' mode is present. This information should be the last received graphics data left and right-hand bits. Graphics data is therefore 'held-over' in the presence of a control character.

Figure 4:
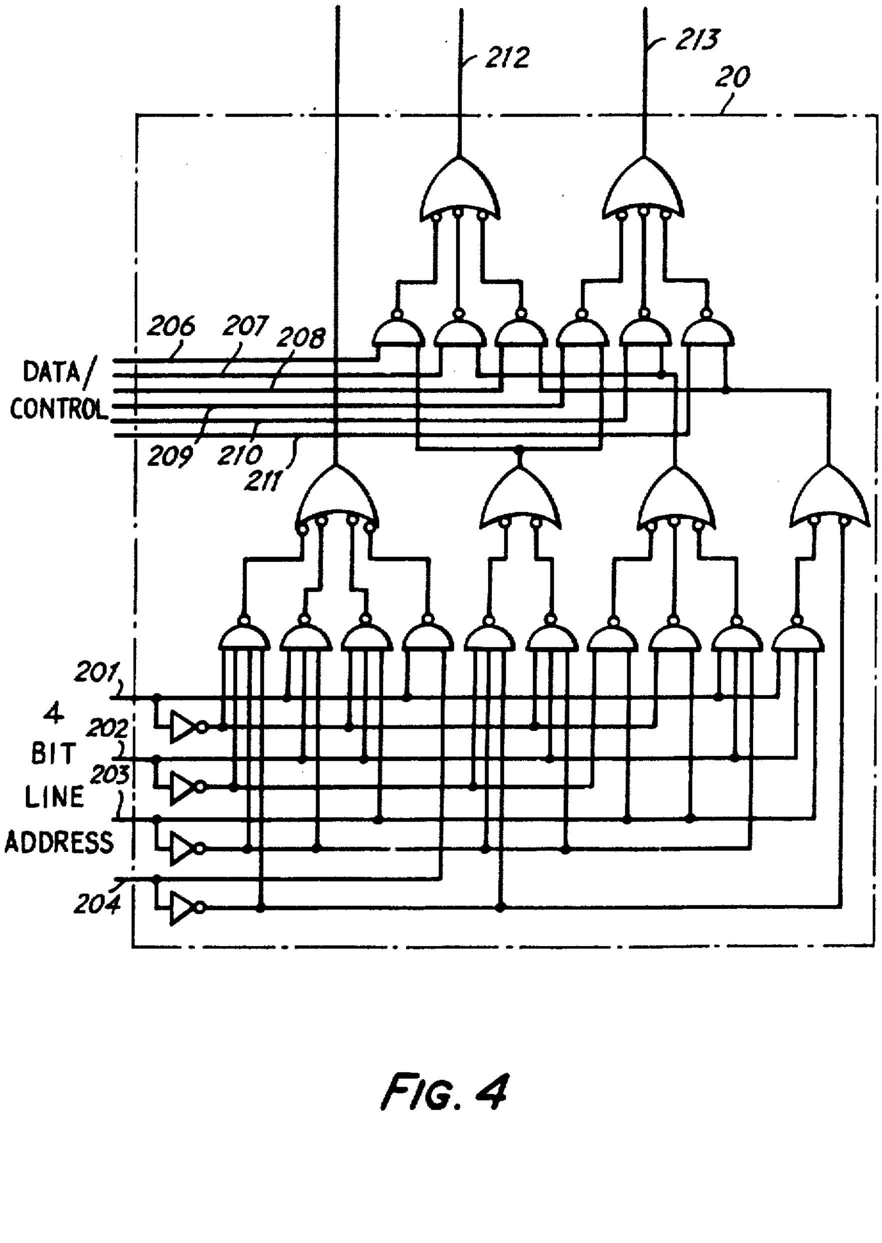
FIG. 4 is a circuit representation of the graphics generator shown in FIG. 3.

FIG. 4 shows in circuit form a suitable arrangement of a combination logic encoder for use as the graphics symbol generator 20 of FIG. 3.

The four-bit address information enters the graphics symbol generator 20; on the four input lines 201–204, and the six-bit data information enters the graphics symbol generator 20 on the input lines 206–211. The two output lines 212 and 213 provide the signals to the two 1-bit stores 21 and 22 (FIG. 3) and the left and right-hand gates 23 and 24 (FIG. 3). The graphics symbol generator 20 employs standard logic gates which may be implemented either in $I^2L$ or NMOS technology, which are both representative of medium speed integrated circuit technology.

Figure 5:
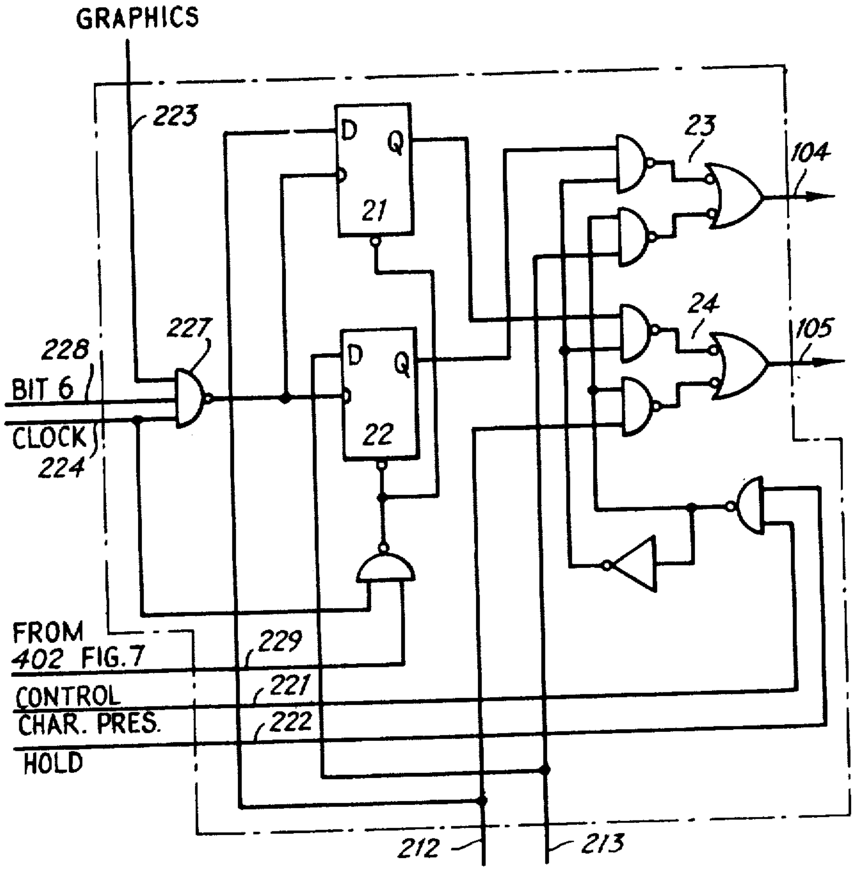
FIG. 5 is a circuit representation of the data stores shown in FIG. 3.

FIG. 5 shows in circuit form a suitable arrangement for the two 1-bit data stores 21 and 22, and the left and right hand gates 23 and 24. The 1-bit data stores 21 and 22 are D-type flip-flops which are arranged to store data for one clock interval representing the interval between graphics characters. The two 1-bit data stores 21 and 22 are clocked by a signal from the NAND-gate 227 which operates under the control of signals on the input lines 223, 224 and 228. The NAND-gate 227 is clocked only when the signals on the input lines indicate that the system is in the graphics mode and the incoming signal is graphics data and not a control character. In this way, graphics data is clocked into the 1bit data stores 21 and 22 only when the incoming data is graphics data. The graphics data in the 1-bit data stores 21 and 22 is held in the absence of incoming graphics data. The left and right hand gates 23 and 24 are instructed by means of signals on the input lines 221 and 222, the signal on the input line 221 being an indication of whether or not a control character is present and the signal on the input line 222 being an instruction of 'hold'. The signals on the lines 212, 213 from the graphics generator 20 (FIG. 4) enter on the lines 212 and 213 and the output signals appear on the lines 104 and 105. The sub-system shown in FIG. 5 may also be implemented in $I^2L$ or NMOS technology.

The two-bit signals from the left and right gates 23 and 24 are passed to a shift register 3 and associated shift register control logic 7, which are shown in FIG. 2. The shift register 3 has a 7-bit parallel input and is arranged to provide a serial output. The full graphics character is generated from the two bits made available by the graphics symbol store 2 via its left and right gates 23 and 24, by loading the first three stages of the shift register 3 with the right-hand bit and loading the last four stages of the sift register 3 with the left-hand bit. This arrangement provides that the left-hand bit is read out first in the serial output. If the right hand bit is a logical '1' the top left four dots of the 'display rectangle' will be illuminated, and if it is a logical '0' these dots will not be illuminated. In the same way the top right three dots of the 'display rectangle' are illuminated for a right hand logical '1' and extinguished for a right hand logical '0'. The 'display rectangle' is divided into six cells, and the top cell is three lines deep, so that dots at the top are illuminated for three lines. The top right cell is illuminated by having the three right hand dots at the top illuminated for four lines. The middle left cell is four dots wide and four lines deep, and the middle right cell is three dots wide and four lines deep, and illumination of either of these requires the information from graphics symbol store to be read for four lines. This is achieved by separating the addresses applied to the data store 1. The bottom left and right cells are three lines deep, and are dealt with in a similar manner.

Figure 6:
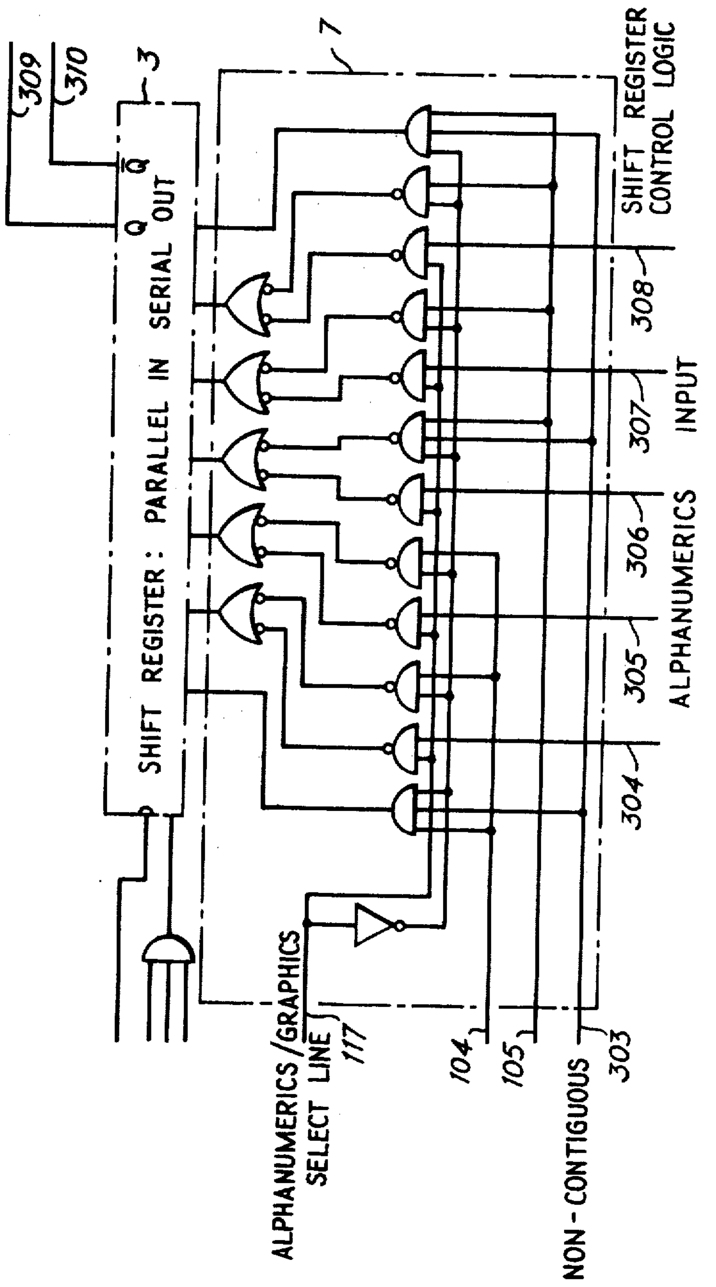
FIG. 6 is a circuit representation of the shift register and shift register control shown in FIG. 1.

A circuit which is suitable for expanding the two bits from the graphics symbol store into seven bits is shown in FIG. 6. The shift register control logic 7 receives the two bits from the graphics symbol store on the lines 104 and 105. The bit on the input line 104 is applied to logic gates which are arranged to load the first three places of the shift register 3, and the bit on the input line 105 is applied to logic gates which are arranged to load the last four places of the shift register 3. Complemented serial output from the shift register 3 is available to the output lines 309 and 310. The shift register control logic 7 is arranged to provide variation of the graphics symbols without the need to alter the organisation of the graphics symbol store 2. For example, non-contiguous graphics may be provided by means of the input line 303. A signal on the input line 303 can be used to disable the logic gates associated with the first, the middle, and the last digits loaded into the shift register 3, with the result that the first, the middle, and the last digits of each line of the 'display rectangle' can be selectively extinguished. In addition, the input lines 304–308 provide inputs to the logic gates which load the shift register 3. The operating speed of the shift register 3 and the shift register control logic 7 makes them suitable for implementation by means of $I^2L$ or NMOS technology.

Figure 1:
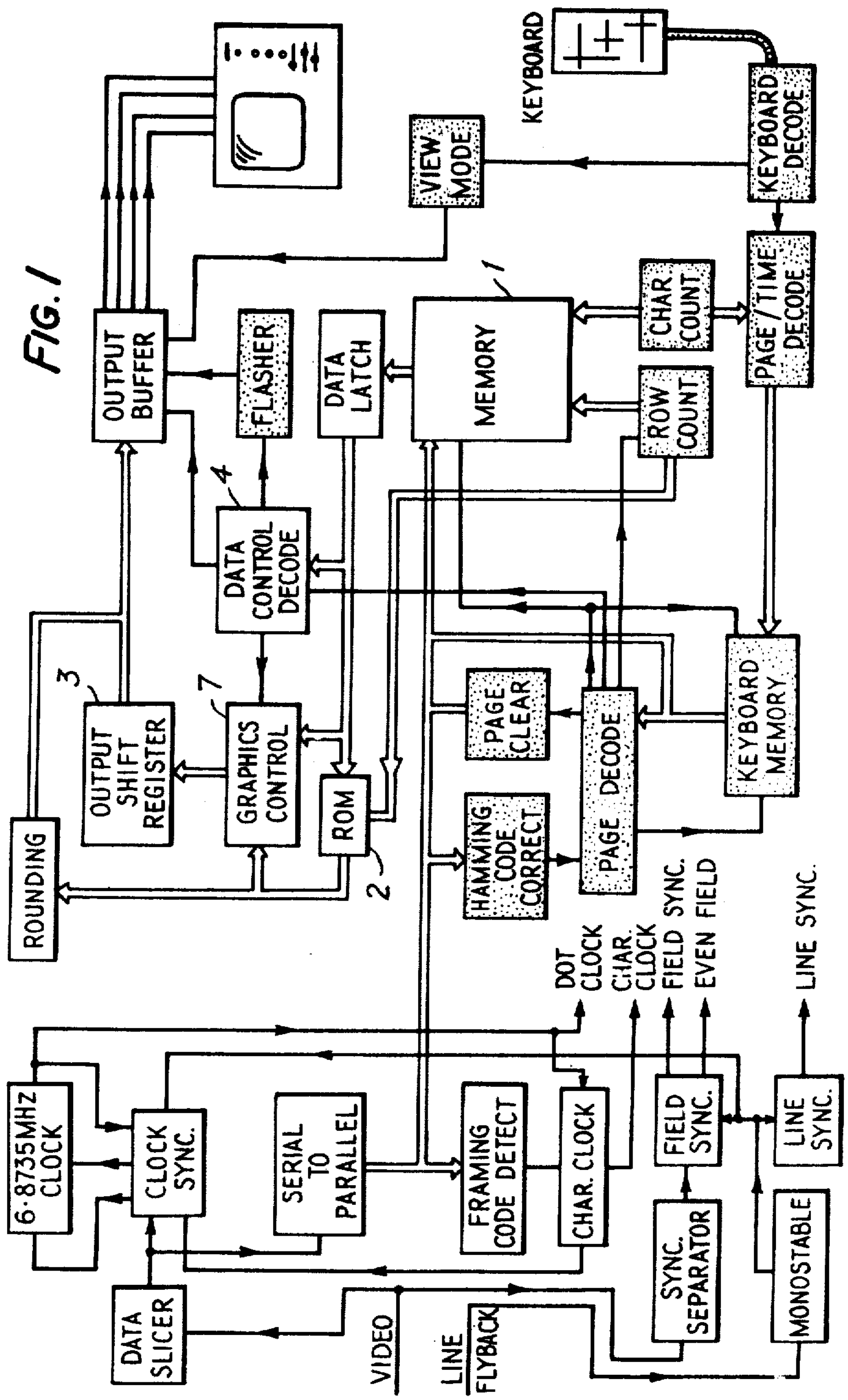
FIG. 1 is a block diagram representation of a teletext data decoder as disclosed by Norris and Parsons and referred to above.

FIG. 1, which identifies in block form the components of a teletext decoder, may be referred to in order to establish the location, in the decoder, of the parts referred to in FIG. 2. The addressable data store 1 of FIG. 2 is referred to as a memory in FIG. 1, the graphics symbol store 2 of FIG. 2 is referred to more specifically in FIG. 1 as a read-only-memory (ROM), the control decoder 4 of FIG. 2 is shown as the data control decoder in FIG. 1, the shift register control logic 7 of FIG. 1 is shown as the graphics control of FIG. 1, and the parallel input shift register 3 of FIG. 2 is shown as the output shift register in FIG. 1. It will be appreciated that there may not be complete correspondence between the components shown in FIGS. 1 and 2, since the boundaries of adjacent blocks cannot be defined absolutely, in such an arrangement.

Figure 7:
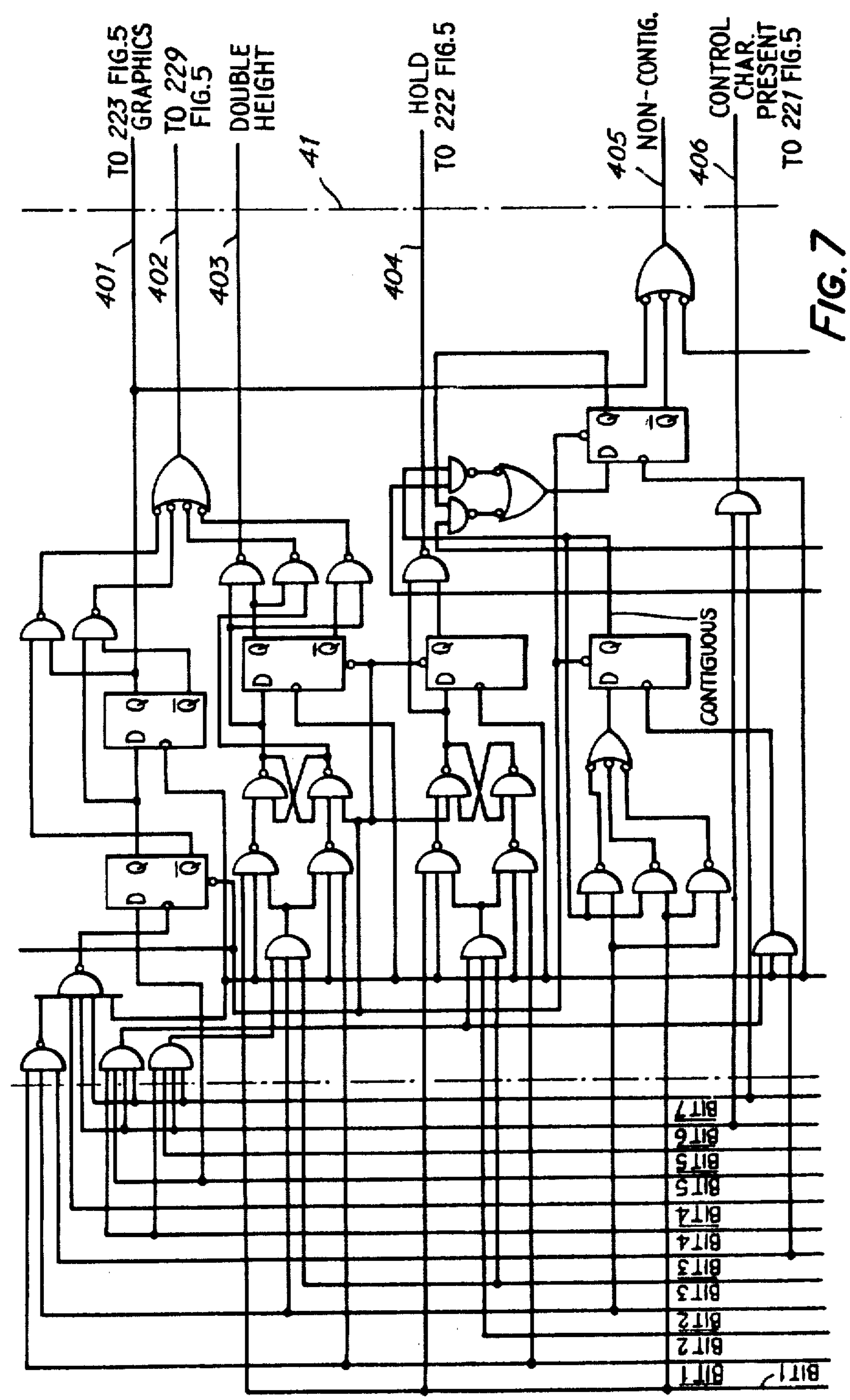
FIG. 7 is a circuit representation of the control logic means shown in FIG. 1 and associated with the functions of holdover and non-contiguous graphics symbols.

Circuit detail of a part of the control decoder 4 shown in FIG. 2 is shown in FIG. 7. The control decoder 4 performs a wide range of functions many of which are not related to the present invention, and therefore only that part of the control decoder 4 which is relevant to the present invention is illustrated in FIG. 7. The seven-bit information stored in the addressable data store 1 is applied to the control decoder 4 which is arranged to generate, from this information, the instructions necessary to effect a display which is capable of operating according to the codes shown at FIG. 8. In this instance, the control decoder 4 is required to recognise control characters and to react to them by providing the appropriate instructions to the graphics symbol store.

By referring to FIG. 7 it can be seen that the control decoder 4 provides as outputs the instructions 'graphics', 'hold', and 'control character present' on the output lines 401, 404 and 406, respectively, connected to lines 223, 222, and 221 in FIG. 4. The presence of these three instructions from the control decoder, causes the graphics symbol store to 'hold over' the previous graphics data. It can be seen, by referring to FIG. 7, that the control decoder 4 also provides such instructions as 'double height' on line 403, and 'non-contiguous graphics' on line 405, for the display. The control decoder can be implemented in medium-speed integrated circuit technology such as $I^2L$ or NMOS.

Although the invention has been described with reference to teletext apparatus, it would be applicable to any graphics display in which control signals are interspersed with the display element signals.

What is claimed is:

1. Apparatus for controlling the display of information which is built up line by line on a raster-type display in response to digital coded data and mode control signals selectively occurring during individual lines of said display, there being a plurality of modes including a graphics mode in which data signals can be displayed during a respective line of said display, the mode control signals indicating the mode in which subsequent data signals are to be displayed during at least part of that line but not themselves generating a display, the apparatus including graphics symbol store means for providing in the graphics mode, in parallel, signals representative of the specified graphics symbol until a further data signal is received, parallel to serial converter means for securing the parallel signals from the graphics symbol store means and in response thereto producing in serial form, signals characteristic of the graphics symbol to be displayed, and control logic means for changing the contents of the graphics symbol store means in response to a graphics symbol signal and to cause said store means to continue to produce the parallel signals already stored in the graphics symbol store means for the duration of a mode control signal when the said mode control signal occurs in place of a data signal during the display of graphics symbols and thereby avoid a blank space in said display resulting from occurrence of said mode control signal.

2. Apparatus as claimed in claim 1, wherein the graphics symbol store means includes a graphics symbol generator which is arranged to generate a two-bit code which is representative of the graphics symbol to be displayed, and left and right 1-bit data stores which are arranged to receive the said two-bit code and to store it until the next graphics symbol signal is received.

3. Apparatus as claimed in claim 2, wherein the parallel to serial converter means includes a parallel to serial shift register and control logic means for said shift register connected for receiving said two-bit data and in response thereto to output a corresponding seven-bit parallel input to said shift register.

4. Apparatus as claimed in claim 1, wherein the graphics symbol store means is so arranged that data signals which are subsequent to a graphics mode control signal can overwrite the data stored in the graphics symbol store means, and a subsequent mode control signal is prevented from overwriting the data stored in the graphics symbol store means.

5. In line scan raster-type display apparatus which is arranged to display digital coded data signals in a plurality of display modes which correspond to a plurality of digital coded mode control signals each of which, in operation, appears during a line scan in place of a digital coded data signal, the display mode including a graphics symbol mode, the improvement comprising a graphics symbol store which is arranged to provide in the graphics mode, in parallel, signals representative of the graphics symbol specified by the current digital coded data signal until a further data signal is received, a parallel to serial converter which is arranged to receive the parallel signals from the graphics symbol store and to provide, in serial form, signals appropriate to the graphics symbol to be displayed, and control logic means for changing the contents of the graphics symbol store only in response to a graphics symbol signal so that the contents of the graphics symbol store are displayed as a graphics symbol for the duration of any digital mode control signal which appears in place of a digital coded data signal in a line scan during the display of graphics symbol, thereby avoiding a blank display during occurrence of the said mode control signal.

6. Display apparatus as claimed in claim 5, wherein the graphics symbol includes graphics symbol generator means for generating a two-bit code which is representative of the graphics symbol to be displayed, and left and right 1-bit data stores which are arranged to receive the said two-bit code and to store it until the next graphics symbol signal is received.

7. Display apparatus as claimed in claim 6, where the parallel to serial converter includes a parallel to serial shift register and its associated control logic which is arranged to receive the two-bit data from the graphics symbol store and to provide seven-bit data from the said two-bit data.

8. Display apparatus as claimed in claim 5, wherein the graphics symbol store is so arranged that data signals which are subsequent to a graphics mode control signal can overwrite the data stored in the graphics symbol store, and a subsequent control signal is prevented from overwriting the data stored in the graphics symbol store.

9. Display apparatus as claimed in claim 7, wherein the parallel to serial shift register control logic is arranged to modify the seven-bit data in accordance with data signals subsequent ot a non-graphics mode control signal.

10. Apparatus for controlling the display of information by a line scan raster-type display in response to digital coded data and mode control signals selectively occurring during individual lines of said display, there being a plurality of modes including a graphic mode in which data signals can be displayed during a respective line of said display, said mode control signals indicating the mode in which subsequent data signals are to be displayed during at least part of that line but not themselves generating a display, comprising:

random access memory means storing at least said graphics symbol signal data and mode control data;

graphics symbol generator means operably connected to said random access memory means for selectively receiving therefrom individual graphics symbol signal data and mode control data and to generate in response to an item of graphics symbol data a two-bit coded output representative of that particular graphics symbol until a further item of signal data is received from said random access memory means;

first and second one-bit data stores for receiving and storing said two-bit coded output from said graphics symbol store means;

parallel to serial converter means including a parallel to serial shift register means and control logic means for said shift register means connected for receiving said two-bit coded output from said graphics symbol generator means and in response thereto to produce and input a corresponding seven-bit parallel input to said shift register means for producing a serial output from said shift register means characteristic of the particular graphics symbol to be displayed;

and logic means for changing the contents of said one-bit stores only in response to receipt of a further item of graphics symbol signal data by said graphics symbol generator means and for inhibiting the change of the contents of said one-bit stores in response to a subsequently occurring item of mode control data thereby to cause said shift register means to continue to produce said serial output corresponding to said particular graphics symbol for display for the duration of said mode control data.

* * * * *